Nov. 17, 1964     J. J. RILEY ETAL     3,157,772
RESISTANCE WELDER WITH ELECTROMAGNETIC FORCE APPLYING MEANS
Filed Jan. 22, 1962     2 Sheets-Sheet 2
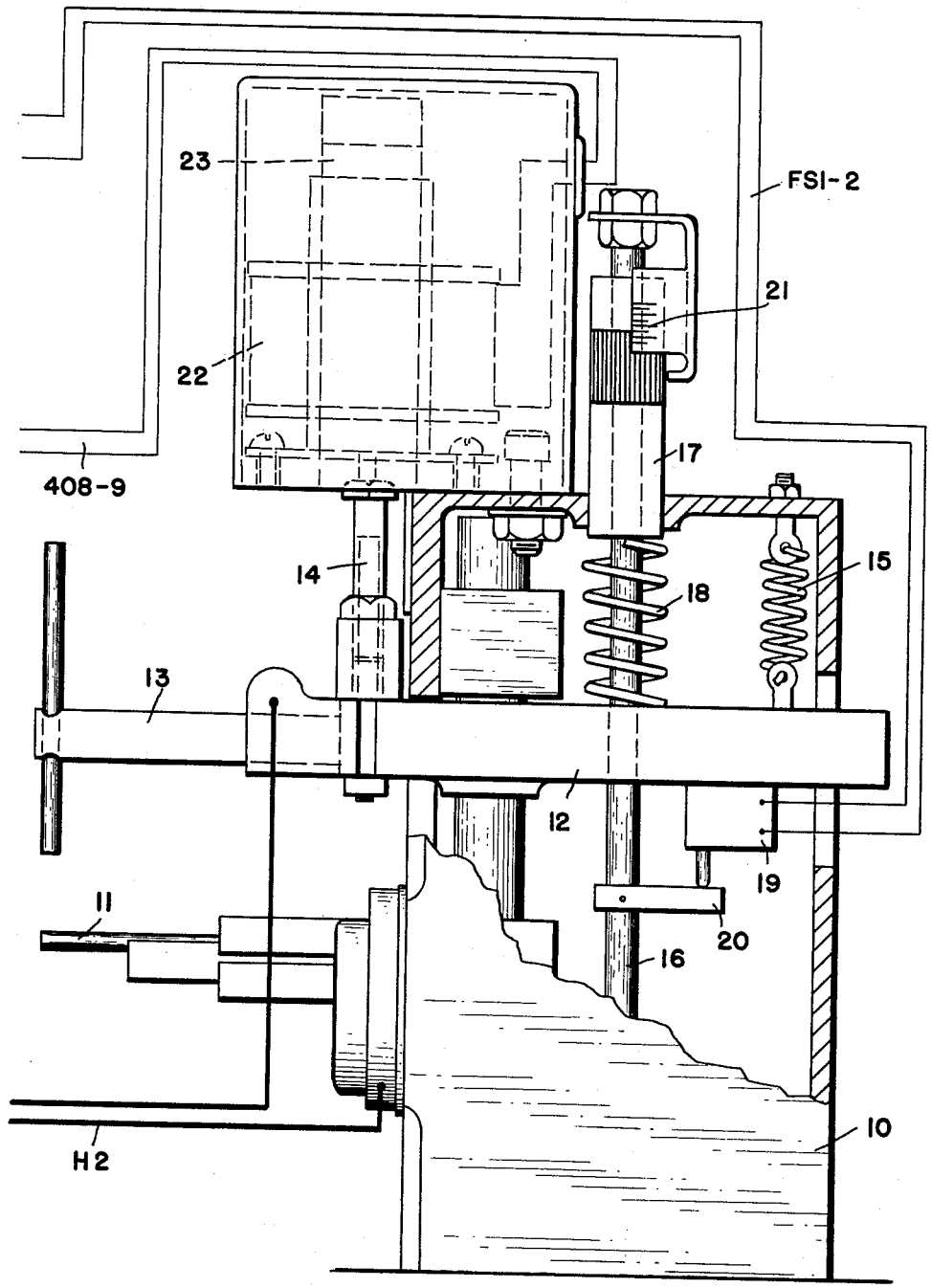
INVENTORS
JOSEPH J. RILEY
BY EMMANUEL V. DETHIER
Francis J. Klempay
ATTORNEY

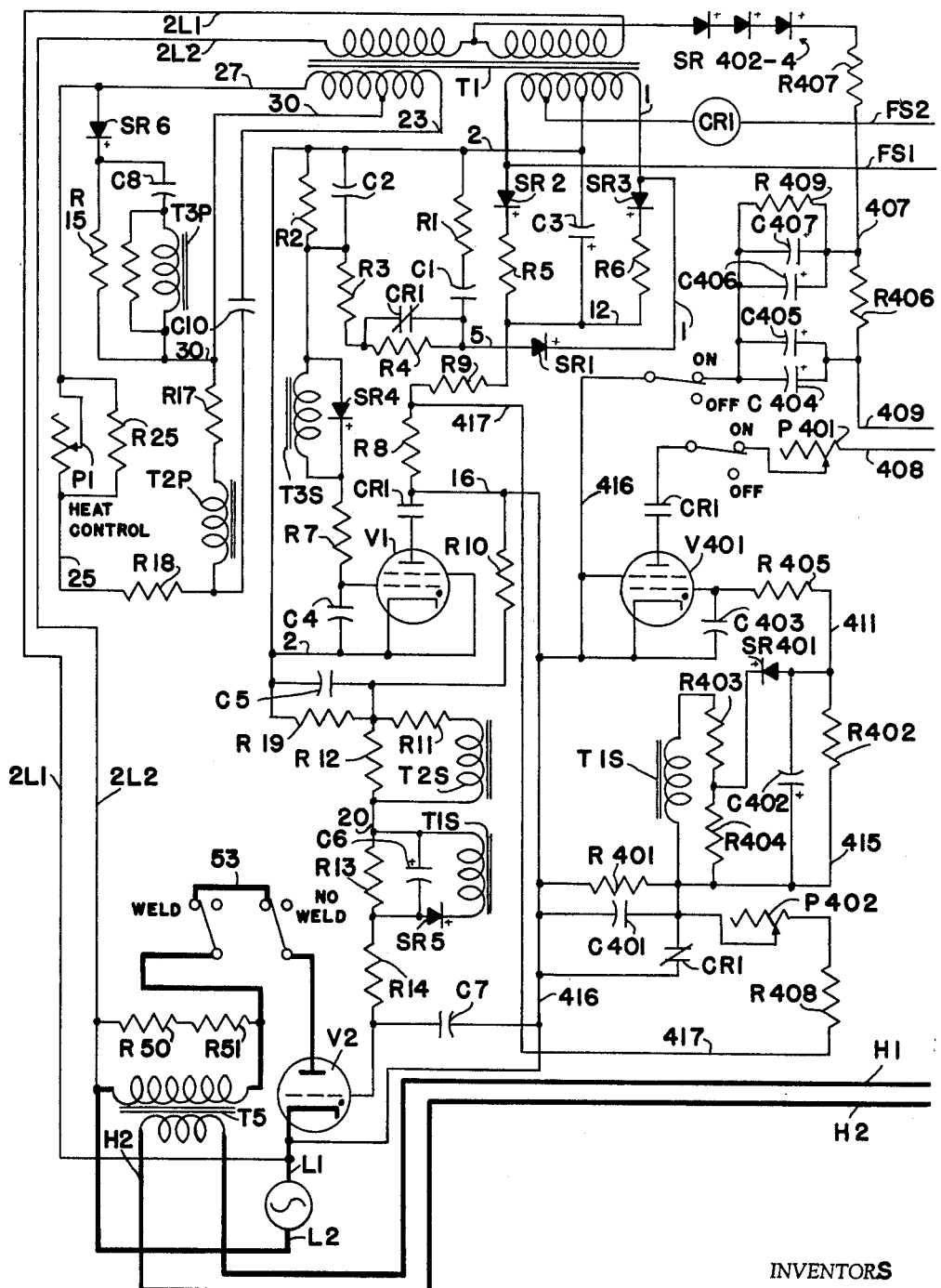

United States Patent Office 3,157,772
Patented Nov. 17, 1964

3,157,772
RESISTANCE WELDER WITH ELECTROMAGNETIC FORCE APPLYING MEANS
Joseph J. Riley and Emmanuel V. Dethier, Warren, Ohio, assignors to The Taylor-Winfield Corporation, Warren, Ohio, a corporation of Ohio
Filed Jan. 22, 1962, Ser. No. 167,492
12 Claims. (Cl. 219—86)

This invention relates to the electric resistance welding art and more particularly to improved apparatus for controlling the application of a forging impact or force to a movable resistance welding electrode during a welding cycle.

It has heretofore been proposed to apply an abrupt increase of force to a resistance welding electrode during or immediately following the flow of welding current to rapidly complete a weld with a minimum of heating, and it has also heretofore been proposed to accomplish this with electromagnetic force applying means. However, the means heretofore proposed to energize the electromagnetic device and to synchronize such energization with the flow of welding current have been deficient in precision and versatility—greatly restricting the applicability of this generally desirable method. When welding products of very small cross-section or when the metal to be welded is of low electrical resistance and high thermal conductivity, for example, it is desirable to complete the weld in as short a time as possible. Commonly, the welding current is restricted to less than a single half cycle of the source, and for the forging force to be effective it must be rapidly and firmly applied in precisely timed relation to the initiation of welding current flow. Also, it is highly desirable and often necessary to vary the magnitude of the force applied and sometimes to continue the force beyond the cessation of flow of welding or heating current.

It is accordingly the primary object of this invention to provide an improved energizing circuit coupled with an improved circuit for timing the energization of an electromagnetic force applying device in electric resistance welding apparatus. The invention provides improved, simplified, and dependable apparatus for applying a precise forging force readily variable in magnitude and in time with respect to the flow of welding current.

A more specific object of the invention is the provision of a simple and dependable electronic arrangement for synchronizing the energization of the electromagnetic force applying means with the firing of an electronic tube used to control the flow of welding current and which in turn may be fired at a variable point on a half cycle voltage wave of the source.

Another object of the invention is the provision of an energizing and control circuit for an electromagnetic welding force applying device which permits of the use of a low inductance device so that the force applying action is almost instantaneous. A further object is to provide a circuit arrangement for this purpose which permits of sustained energization of the device without excessive heating.

The above and other objects and advantages of the invention will become apparent upon consideration of the following specification and accompanying drawing wherein there is disclosed a preferred embodiment of the invention.

The single figure of the drawing, on two sheets, shows in its right portion a small electric resistance spot welder having an electromagnetic device for applying a welding force and in its left portion the control circuit of the invention for supplying welding current and for energizing the magnetic device.

In the drawing, reference numeral 10 represents the frame of a small bench welder having a fixed current-conductive lower horn 11. Suitably mounted for vertical sliding movement in the frame 10 is a member 12 which adjustably mounts on its forward end a current-conductive electrode holder 13 and an upwardly extending adjustable stud 14. Welding current is supplied to the electrodes of this machine through conductors H1, H2 from a welding transformer T5. Transformer T5 is energized, in turn, from a source L1, L2 under the control of a thyratron V2.

Member 12 is biased to upper position by a return spring 15, and to move this member downwardly whereby the electrodes may be closed onto the work and welding force applied, we provide a rod 16 which is arranged to be moved downwardly by suitable means, not shown, such as a foot treadle. Screw-threaded onto the upper end portion of the rod 16 is a sleeve 17 slidably received in an aperture in the upper wall of the frame 10 and which is adapted to bear at its lower end against the upper end of a coil spring 18. Also carried by the member 12 is a normally closed limit switch 19, the operator of which extends downwardly and bears against an arm 20 rigidly fixed onto the rod 16. Either the switch operator shown or other suitable means, not shown, may be employed to limit the upward travel of the rod 16 with respect to the member 12, and it should be apparent that in this manner the spring 18 may be precompressed an adjustable amount determined by the setting of the sleeve 17. A suitable indicating scale 21 shows the extent of preloading of the spring 18 and, as will appear later, this preloading determines the initial squeeze force applied to the work by the welding electrodes before and at the time welding current is first supplied thereto.

Rigidly mounted on the top wall of the frame 10 is a solenoid coil 22 whose armature 23 bears at its lower end on the adjustable stud 14. The armature 23 tends to move downwardly with considerable force when the coil 22 is energized through conductors 408–9 and this energization is timed by the circuitry now to be described, with the flow of welding current to provide a welding forge pressure or force of the desired intensity and in the desired timed relation to the softening of the work.

Switch 19 which may be termed an initiating switch and is so interconnected through conductors FS1–2 and a secondary of transformer T1 as to energize the relay CR1 at the start of a welding cycle—when the electrodes are closed onto the work and sufficient squeeze force is applied to further compress spring 18. Relay CR1 has normally open contacts in the plate circuits of a pair of gaseous grid-controlled discharge devices V1 and V401 and certain other contacts shown on the drawing—the functions of which will be later explained.

The primary winding of transformer T1 is energized from the source L1–2 through the conductors 2L1–2, and this latter circuit also provides a charging circuit for a bank of capacitors C404–7. This charging circuit may be traced from line conductor 2L1 through one section of the primary winding of transformer T1, rectifiers SR402–4, limiting resistors R406–7 and conductor 416 to line conductor L1. The capacitor bank C404–7 is arranged to be discharged through the solenoid coil 22 by a circuit comprised of the conductors 409–8, a potentiometer P401, the tube V401, and conductor 416. The strength of current furnished the coil 22 and thus the strength of the forging force applied to the welding electrodes is, of course, controlled by the setting of the potentiometer P401, and due to the presence of relay contact CR1 in the plate circuit of V401 this energizing circuit is conditioned for operation upon closure of switch 19. However, as explained above, it is desirable to energize coil 22 in synchronous timed relation to the initiation of flow of the welding current and this is accomplished by the grid control of the tube V401.

A holdoff bias is supplied to the control grid of tube V401 by a charge on a capacitor C402 which has its positive side connected to the cathode of V401 through resistance R401 and its negative side connected to the control grid of V401 through conductor 411 and resistor R405. Capacitor C402 is charged from a secondary winding T1S of the transformer T1 through a voltage dividing network comprised of the resistances R403–4 and rectifier SR401.

Tube V2 which controls the flow of welding current translated to transformer T5 is so controlled that it initiates the flow of welding current at a precise adjustable point on a half cycle voltage wave of the source. This tube is normally held off by a biasing voltage appearing across capacitor C6 and resistor R13, the capacitor being charged through a secondary T1S of the transformer T1 and a rectifier SR5. The positive side of this capacitor is connected to the cathode of tube V2 through resistances R12, R10 and conductor 16 while the negative side is connected to the control grid of V2 through resistance R14. Resistance R12 is adapted to impose an opposite bias in this circuit upon a phase controlled pulse being applied to its connected transformer secondary T2S and transmitted through resistor R11. The phase shifting network comprises the transformer primary T2P, one terminal of which is connected through resistance R17 and conductor 30 to the center tap of a secondary winding of transformer T1. The opposite terminal of T2P is connected through capacitor C10 to one end terminal of this center-tapped secondary by conductor 23′ and also to the opposite end terminal of this center-tapped secondary through resistance R18, potentiometer P1 (shunted by fixed resistor R25) and conductor 27.

In normal standby condition the voltage developed across resistance R12 is insufficient to overcome the holdoff bias at resistance R13 and a triggering circuit is necessary which will now be described. Tube V1 may be taken as the initiating tube and while its plate is connected to a power source (to be described) upon closure of relay CR1 it is initially held off by a control grid bias furnished by a charge on capacitor C2 whose positive side is connected to the cathode through conductor 2 while its negative terminal is connected to the control grid through transformer secondary T3S and resistance R7. The power source for tube V1 is the capacitor C3 which is charged from a center tapped secondary of the transformer T1 by means of the rectifiers SR2–3 and current limiting resistors R5–6. As shown, the positive side of capacitor C3 is connected to the anode of tube V1 through resistors R9–8 and contact CR1 while the negative terminal is connected to the cathode through conductor 2. It should also be observed that the capacitor C2 is charged from one-half portion of this secondary through resistances R3–4 and rectifier SR1, the resistance R4 being shunted by normally closed contacts of relay CR1. Also charged by rectifier SR1 is a capacitor C1 having a resistance R1 in series therewith. Also charged by rectifiers SR2–3 through resistances R8–10 is a capacitor C5. Connected across capacitor C5 is a resistor R19.

T3 is a peaking transformer whose primary T3P is connected across conductors 27 and 30 in series with the rectifier SR6 and a capacitor C8 while the primary and capacitor is shunted by a resistance R15. The purpose of this arrangement is to provide a sharp impulse through transformer T3 to trigger the tube V1 always at the proper time in relation to the voltage appearing across tube V2. When the initiating switch 19 is closed, relay CR1 is energized and the contacts across resistor R4 are opened so that a voltage dividing network comprised of resistors R2–4 becomes effective. After a slight time delay of one or two cycles of the alternating current source the voltage across capacitor C2 lowers sufficiently to allow the reference signal on transformer T3S to fire tube V1. Upon this happening the charging source is removed from capacitor C5 and it proceeds to discharge through resistor R10 (in the grid circuit of tube V2) in a direction to overcome the negative bias across resistor R13 and permit the next peaking signal supplied by transformer T2S to trigger the tube V2.

Upon conduction, tube V2 will transmit such portion of a half cycle of the source as is predetermined by the setting of the heat control potentiometer P1 acting through transformer T2. At a variable time during or after this flow of welding current the tube V401 is triggered on to discharge the capacitor bank C404–7 through the solenoid coil 22 to exert a forging impact on the member 12 and thus to the movable electrode of the welder. The discharge circuit may be traced from the capacitors through conductor 409, coil 22, conductor 408, potentiometer P401, contact CR1 ad tube 401 to the opposite side of the capacitors. As stated above, the setting of potentiometer P401 will determine the strength of current supplied by the coil 22 and thus the intensity of the forging impact applied to the movable electrode of the welder. To vary the delay between the initiation of welding current flow and the energization of solenoid coil 22 adjustment is made in the setting of potentiometer P402. When tube V1 conducts the voltage developed across resistor R8 charges the capacitor C401 at a rate determined by the setting of potentiometer P402. When the voltage across capacitor C401 and resistor R401 (line 415 positive) becomes greater than the negative bias voltage (line 411 negative) across resistor R402, tube V401 conducts.

It will thus be seen that in the specific circuit illustrated conduction of the initiating tube V1 conditions both the weld current tube V2 and the forge tube V401 for conduction. Rectifier SR6 insures conduction of V1 in the proper half cycle polarity as related to the connection of tube V2. Only a half cycle or a portion of the half cycle of the source is translated because the tube V1 is powered by the capacitor C3 which discharges quickly and does not resume the breakdown voltage of the tube V1 until well beyond the normal cyclic sequence of the welder—i.e. until after the switch 19 is opened to de-energize relay CR1 to thus open the plate circuits of the tubes V1 and V401. Timing capacitor C401 is now rapidly discharged, capacitor C5 is recharged, all the tubes are extinguished, and the system is in standby condition awaiting the next welding cycle.

It should now be apparent that we have provided an improved energizing and control circuit for an electromagnetic force applying means in electric resistance welding apparatus which accomplishes the objects initially set out. By conditioning the functioning of both the welding current supply circuit and the solenoid energizing circuit on conduction of the thyratron initiating tube V1 precise synchronization may be achieved regardless of the firing angle of the weld current contactor (tube V2). The operational reliability of the overall control is insured by imposing a peaked positive bias on tube V1 early in that half cycle of the source in which welding current will flow or initiate.

By storing energy for forge solenoid actuation in a capacitor bank precise actuation timing may be achieved and the magnitude of the actuating current and resultant force may be very easily varied. Further, since the voltage on the capacitors drops precipitously upon firing of tube V401 (interconnection of solenoid) the solenoid may be of low inductance for fast reaction of the armature thereof. However, sufficient voltage remains to cause the armature to continue to exert an appreciable force during a reasonable weld cooling interval, if desired, but the rate of decay is sufficient to avoid excessive heating of the solenoid during normal operation of the welding apparatus. Note that capacitors C404-5 has only the resistance of P401 in their discharge circuit while capacitors C406-7 discharge also through R406. The absence of chattering or rebound is highly advantageous particularly when making delicate welds.

With suitable circuit modifications generally understood by those familiar with the art the principles of our invention having to do with the synchronous timing and the control of strength of the flow of the forging current may be applied to full and/or multiple cycle welders, and such embodiments are well within the purview of our invention. Various other changes may also be made in the circuitry above specifically described without departing from the spirit or scope of our invention, and reference should accordingly be had to the appended claims in determining the scope of our invention.

We claim:

1. In electric resistance welding apparatus having a pair of relatively movable welding electrodes, means to supply welding current to said electrodes, means to supply an initial squeeze pressure to said electrodes, and a low-inductance electromagnetic device mechanically coupled to one of said electrodes operative to impart a forging force to said one of said electrodes, the improvement comprising
   (a) an energy storing capacitor connected to said device through a controlled discharge valve and having a charging circuit,
   (b) means to condition for operation said means to supply welding current, and
   (c) means to initiate conduction in said valve after the elapse of a preselected time interval following conditioning of said welding current supply means.

2. Apparatus according to claim 1 further characterized in that said means to supply welding current comprises an alternating current source and a second controlled discharge valve for controlling the flow of current from said source, and further including
   (d) means to initiate conduction in said second valve at a preselected point in a half cycle of the voltage wave of said source.

3. Apparatus according to claim 1 further characterized in that said means to supply welding current comprises a source of alternating current and a second controlled discharge valve to control the flow of current from said source,
   (e) means to impress a negative holdoff bias on said second valve, means to impress a positive bias on said second valve of less value than said holdoff bias but timed synchronously with the voltage wave of said source, and
   (f) said means to condition comprising means to remove said holdoff bias from said second discharge valve.

4. Apparatus according to claim 1 further including
   (g) means to impress a negative holdoff bias on said controlled discharge valve, and
   (h) means operative upon conditioning of said welding current supply means to impress a rising positive bias having a preselected rate of rise onto said controlled discharge valve.

5. In electric resistance welding apparatus having welding electrodes, means to supply welding current to said electrodes, means to supply an initial squeeze pressure to said electrodes, and an electromagnetic device to impart a forging force to said electrodes, the improvement comprising
   (a) an energy storing capacitor connected to said device through a controlled discharge valve and having a charging circuit,
   (b) said means to supply welding current comprising a second controlled discharge valve connected into an alternating current source and normally biased negatively to cutoff but having associated means to be fired synchronously with the voltage wave of said source,
   (c) a third controlled discharge valve normally held non-conductive but having associated means to be fired synchronously with the voltage wave of said source,
   (d) an initiating switch on said apparatus closable upon said squeeze pressure being applied, and means responsive to closure of said switch to condition said third valve for conduction upon appearance of the next succeeding synchronous signal from the source, and
   (e) circuit means operative upon conduction of said third valve to condition said second valve for conduction upon the appearance thereon of the next succeeding synchronous signal from said source and to initiate conduction in the first mentioned control discharge valve a preselected interval after initiation of conduction in said second mentioned valve.

6. Apparatus according to claim 5 further including
   (f) a second capacitor for powering said second valve and a charging circuit for said second capacitor having current limiting resistors therein, the arrangement being such that in normal frequency of operation of the welding apparatus the second valve will conduct for not more than one-half cycle of the source during each welding cycle.

7. Apparatus according to claim 5 further including
   (g) a variable resistor in the circuit for discharging said capacitor through said electromagnetic device to thereby vary the strength of current applied to said device and thus to vary the forging force applied to said electrodes.

8. Apparatus according to claim 1 further including
   (i) a variable resistor in the circuit for discharging said capacitor through said electromagnetic device to thereby vary the strength of current applied to said device and thus to vary the forging force applied to said electrodes.

9. In electric resistance welding apparatus having a pair of relatively movable welding electrodes, means to supply welding current to said electrodes, and a low-inductance electromagnetic device mechanically coupled to one of said electrodes operative to impart a weld forging force to said one of said electrodes, the improvement comprising
   (a) an energy storing capacitor having a charging circuit and a discharge circuit to energize said device,
   (b) means to initiate the flow of welding current to said electrodes, and
   (c) means to activate said discharge circuit in preselected time relation to the initiation of welding current flow.

10. Apparatus according to claim 9 further including a
    (d) variable resistor in said discharge circuit to control the strength of current applied to said electromagnetic device and to thereby control the forging force created thereby.

11. In electric resistance welding apparatus having welding electrodes, means to supply welding current to said electrodes, and an electromagnetic device to impart a weld forging force to said electrodes, the improvement comprising an energizing circuit for said electromagnetic device having means to impart an initial high D.C. voltage and initial high current flow to the device followed by a sustained lower level of voltage and current, the arrangement being such that said electromagnetic device may be energized to impart an initial quick-responsive large forging force followed by a smaller holding force without overheating of the device, and means to connect said energizing circuit to said device in timed relation to the initiation of flow of welding current to said electrodes.

12. Apparatus according to claim 11 further characterized in that said energizing circuit comprises a first capacitor arranged to be connected directly to said device upon actuation of said means to connect and a second capacitor arranged to be connected to said device through a resistor upon actuation of said means to connect.

References Cited in the file of this patent

UNITED STATES PATENTS

| | | |
|---|---|---|
| 2,081,987 | Dawson | June 1, 1937 |
| 2,158,885 | Palmer | May 16, 1939 |
| 2,190,514 | Garman | Feb. 13, 1940 |
| 2,315,916 | Whiteley et al. | Apr. 6, 1943 |
| 2,340,131 | Lord | Jan. 25, 1944 |
| 2,363,753 | Smith et al. | Nov. 28, 1944 |
| 2,459,796 | Dawson | Jan. 25, 1949 |
| 2,948,804 | Schueler et al. | Aug. 9, 1960 |